United States Patent
Green et al.

(10) Patent No.: US 7,083,975 B2
(45) Date of Patent: Aug. 1, 2006

(54) MICROARRAY SYNTHESIS INSTRUMENT AND METHOD

(76) Inventors: Roland Green, 2017 Frazer Pl., Madison, WI (US) 53713; Alan Pitas, 120 W. Church St., Evansville, WI (US) 53336; Francesco Cerrina, 2122 Van Hise Ave., Madison, WI (US) 53705

( * ) Notice: Subject to any disclaimer, the term of this patent is extended or adjusted under 35 U.S.C. 154(b) by 0 days.

(21) Appl. No.: 10/062,918

(22) Filed: Feb. 1, 2002

(65) Prior Publication Data

US 2003/0148502 A1 Aug. 7, 2003

(51) Int. Cl.
*C12M 1/00* (2006.01)

(52) U.S. Cl. ............... 435/289.1; 435/287.2; 435/288.3; 422/82.05

(58) Field of Classification Search .......... 435/289.1, 435/287.2, 288.3; 422/82.05
See application file for complete search history.

(56) References Cited

U.S. PATENT DOCUMENTS

| | | | |
|---|---|---|---|
| 4,499,162 A | | 2/1985 | Banks et al. |
| 5,599,668 A | * | 2/1997 | Stimpson et al. ............ 435/6 |
| 5,757,014 A | | 5/1998 | Bruno et al. |
| 6,307,042 B1 | * | 10/2001 | Goldberg et al. .......... 536/25.3 |
| 6,375,903 B1 | * | 4/2002 | Cerrina et al. ............ 422/131 |
| 6,403,367 B1 | * | 6/2002 | Cheng et al. ............ 435/287.1 |
| 6,555,361 B1 | * | 4/2003 | Lyman et al. ............ 435/287.2 |
| 6,677,131 B1 | * | 1/2004 | Yuen ............................ 435/29 |

FOREIGN PATENT DOCUMENTS

| | | | |
|---|---|---|---|
| JP | 10176992 | * | 6/1998 |
| WO | WO 99/42813 | | 8/1999 |
| WO | WO 99/63385 | | 12/1999 |

OTHER PUBLICATIONS

Goodall, F. N., et al., "Excimer laser photolithography with 1:1 Wynne-Dyson optics," Proceedings of SPIE-The International Society for Optical Engineering, 922:410-416 (1988).

* cited by examiner

*Primary Examiner*—David Redding
(74) *Attorney, Agent, or Firm*—Quarles & Brady LLP

(57) ABSTRACT

During the light illumination period of a monomer addition cycle in synthesizing an DNA microarray, undesirable reflections of illumination light from various interfaces that the illumination light passes through near the synthesis surface of the substrate may reduce the light-dark contrast, and negatively affect the precision and resolution of the microarray synthesis. The present invention provides an flow cell that reduces the undesired reflections by constructing certain flow cell structures with materials that have similar refractive indexes as that of the solution that is in the oligomer synthesis chamber during the illumination period and/or constructing certain flow cell structures or covering the structures with a layer of a material that has a high extinction coefficient.

8 Claims, 7 Drawing Sheets

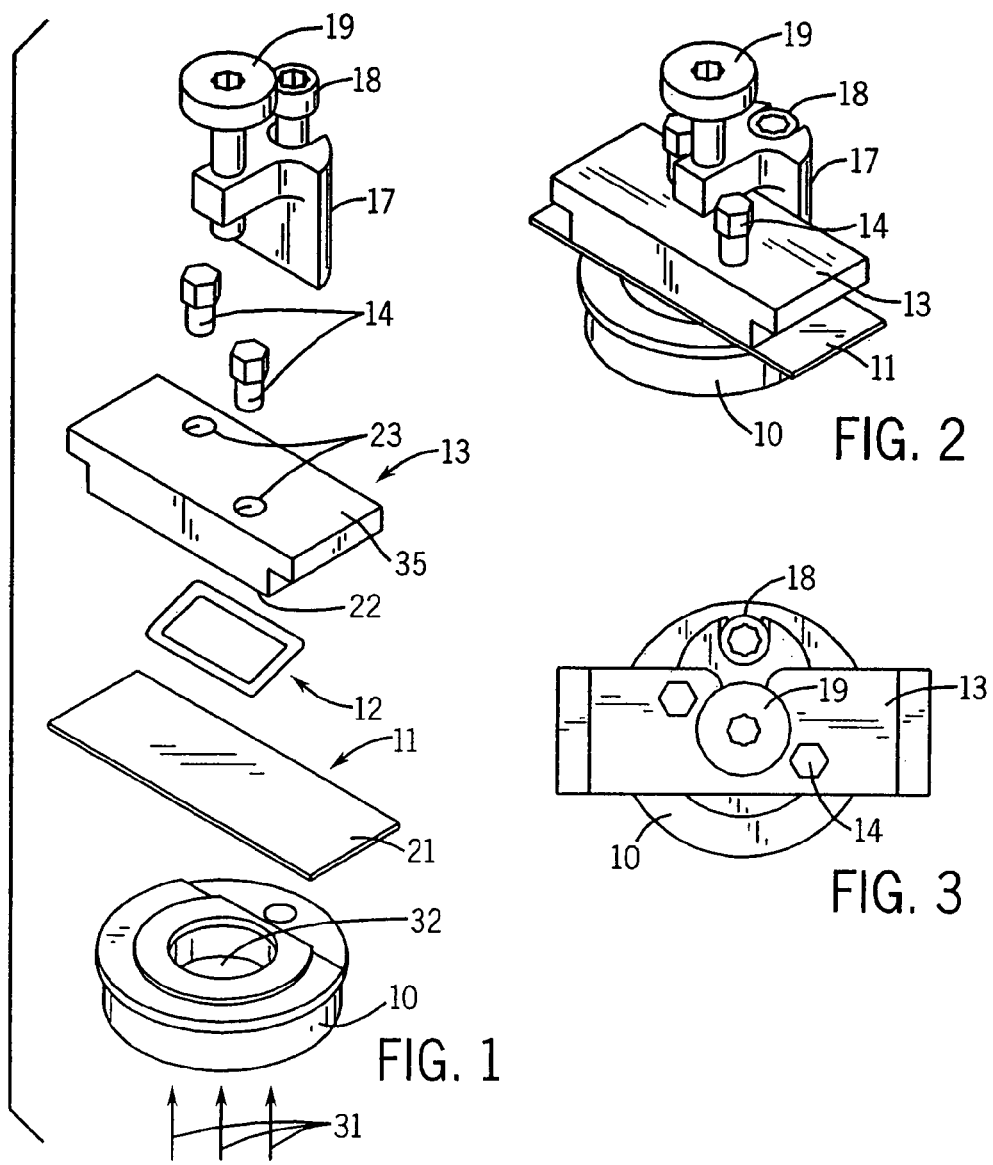
FIG. 2
FIG. 3
FIG. 1
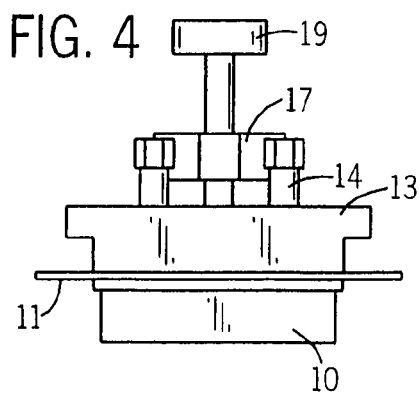
FIG. 4
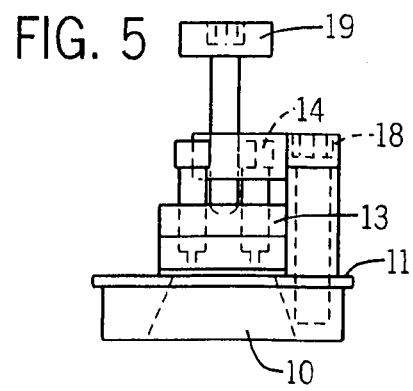
FIG. 5

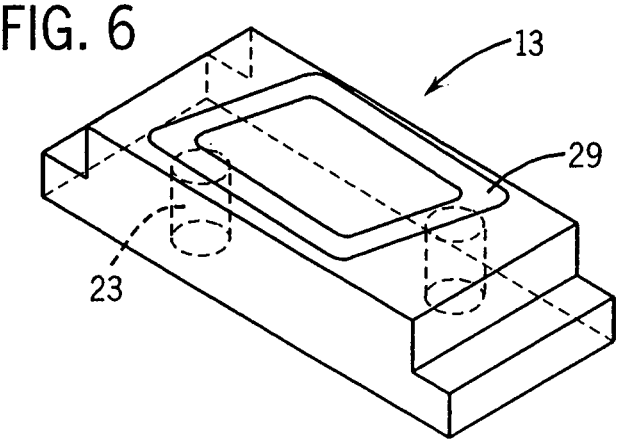
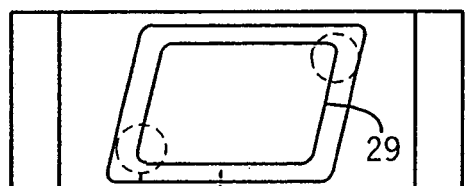
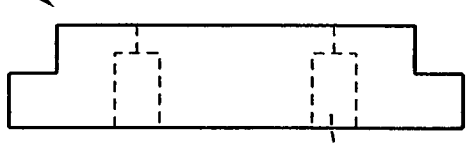
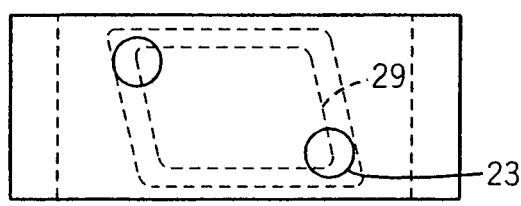
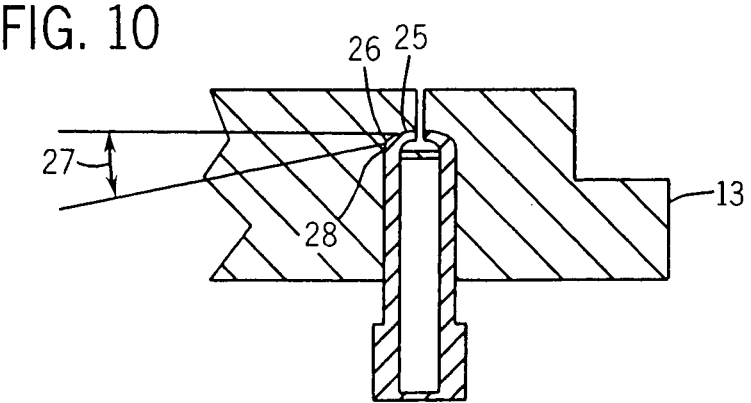

MICROARRAY SYNTHESIS INSTRUMENT AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The sequencing of deoxyribonucleic acid (DNA) is a fundamental tool of modem biology and is conventionally carried out in various ways, commonly by processes which separate DNA segments by electrophoresis. See, e.g., "DNA Sequencing," *Current Protocols In Molecular Biology*, Vol. 1, Chapter 7 (1995). The sequencing of several important genomes has already been completed (e.g., yeast, *E. coli*), and work is proceeding on the sequencing of other genomes of medical and agricultural importance (e.g., human, *C. elegans, Arabidopsis*). In the medical context, it will be necessary to "re-sequence" the genome of large numbers of human individuals to determine which genotypes are associated with which diseases. Such sequencing techniques can be used to determine which genes are active and which are inactive, either in specific tissues, such as cancers, or more generally in individuals exhibiting genetically influenced diseases. The results of such investigations can allow identification of the proteins that are good targets for new drugs or identification of appropriate genetic alterations that may be effective in genetic therapy. Other applications lie in fields such as soil ecology or pathology where it would be desirable to be able to isolate DNA from any soil or tissue sample and use probes from ribosomal DNA sequences from all known microbes to identify the microbes present in the sample.

The conventional sequencing of DNA using electrophoresis is typically laborious and time consuming. Various alternatives to conventional DNA sequencing have been proposed. One such alternative approach, utilizing an array of oligonucleotide probes synthesized by photolithographic techniques is described in Pease, et al., "Light-Generated Oligonucleotide Arrays for Rapid DNA Sequence Analysis," *Proc. Natl. Acad. Sci. USA*, 91: 5022–5026 (May 1994). In this approach, the surface of a solid support modified with photolabile protecting groups is illuminated through a photolithographic mask, yielding reactive hydroxyl groups in the illuminated regions. A 3' activated deoxynucleoside, protected at the 5' hydroxyl with a photolabile group, is then provided to the surface such that coupling occurs at sites that had been exposed to light. Following capping, and oxidation, the substrate is rinsed and the surface is illuminated through a second mask to expose additional hydroxyl groups for coupling. A second 5' protected activated deoxynucleoside base is presented to the surface. The selective photodeprotection and coupling cycles are repeated to build up levels of bases until the desired set of probes is obtained. It may be possible to generate high density miniaturized arrays of oligonucleotide probes using such photolithographic techniques wherein the sequence of the oligonucleotide probe at each site in the array is known. These probes can then be used to search for complementary sequences on a target strand of DNA, with detection of the target that has hybridized to particular probes accomplished by the use of fluorescent markers coupled to the targets and inspection by an appropriate fluorescence scanning microscope. A variation of this process using polymeric semiconductor photoresists, which are selectively patterned by photolithographic techniques, rather than using photolabile 5' protecting groups, is described in McGall, et al., "Light-Directed Synthesis of High-Density Oligonucleotide Arrays Using Semiconductor Photoresists," *Proc. Natl. Acad. Sci. USA*, 93:13555–13560 (November 1996), and G. H. McGall, et al., "The Efficiency of Light-Directed Synthesis of DNA Arrays on Glass Substrates," *Journal of the American Chemical Society* 119:22:5081–5090 (1997).

A disadvantage of both of these approaches is that four different lithographic masks are needed for each monomeric base, and the total number of different masks required are thus four times the length of the DNA probe sequences to be synthesized. The high cost of producing the many precision photolithographic masks that are required, and the multiple processing steps required for repositioning of the masks for every exposure, contribute to relatively high costs and lengthy processing times.

A similar problem exists for synthesis of diverse sequences of other types of oligomers, such as polypeptides, which are useful for determining binding affinity in screening studies. For example, Pirrung et al., U.S. Pat. No. 5,143,854 (see also PCT Application No. WO 90/15070) discloses methods of forming vast arrays of peptides using light-directed synthesis techniques. However, the large number of lithographic masks needed in the synthesis makes the fixed cost for this process relatively high and the processing time lengthy.

A patterning process described in Cerrina et al., PCT Application No. WO 99/42813 overcomes the above problems. With this patterning process, an image is projected onto an activate surface of a substrate for oligomer synthesis utilizing an image former that includes a light source that provides light to a micromirror device including an array of electronically addressable micromirrors. The substrate is activated in a defined pattern and monomers are coupled to the activated sites, with further repeats until the elements of a two-dimensional array on the substrate have an appropriate monomer bound thereto. The micromirror arrays can be controlled in conjunction with an oligomer synthesizer to control the sequencing of images presented by the micromirror array in coordination with the reagents provided to the substrate. The patterning process eliminated the requirement of lithographic masks for selectively illuminating certain oligomer synthesis positions.

In an instrument for the synthesis of nucleic acid probes using light, strict control of the light in the instrument proves to be a critical parameter. Light which is misdirected, inadvertently reflected, or otherwise directly randomly inside the instrument, here referred to as "stray light," can adversely affect the overall accuracy and fidelity of the arrays made by the instrument. Excess stray light can lead to the de-protection of areas of the array other than the ones intended to be de-protected, and thus cause errors in the synthesis of probes. This problem cannot be well controlled in a photolithographic process, where the use of masks interposed between the light source and the array synthesis cell inherently cause refracted light in some amount to be direct where it is not intended. However, the development of the maskless array synthesizer permits the level of stray light in the instrument to be minimized to an extent that was not possible before.

BRIEF SUMMARY OF THE INVENTION

In general, the invention is summaries in a flow cell for a microarray synthesis instrument which has a substrate onto which nucleic acid probes are to be synthesized and a block located behind the substrate, the block having a void formed in its front surface so that a flow cell is defined between the block and the substrate, the material of the block and the medium in the flow cell are selected to have substantially the same index of refraction so as tot limit stray light in the flow cell.

The present invention has the advantage in that it minimizes reflected light and therefore undesired reactions during the synthesis of microarrays.

It is a feature of the present invention that the utilization of light in the maskless array synthesis instrument is made more efficient.

Further objects, features and advantages of the invention will be apparent from the following detailed description when taken in conjunction with the accompanying drawings.

BRIEF DESCRIPTION OF THE SEVERAL VIEWS OF THE DRAWINGS

FIGS. 1 and 2 are exploded and assembled perspective views of a flow cell embodiment of the present invention for use within the instrument of FIGS. 18 and 19.

FIGS. 3, 4 and 5 are top, front and side views of the assembled flow cell embodiment in FIG. 2.

FIG. 6 is a perspective view of the block 13 in FIG. 1.

FIGS. 7, 8 and 9 are top, bottom and side views of the block 13 in FIG. 6.

FIG. 10 is a cross section view of a hole 23 of the block 13 depicted in FIG. 1, with a fluid fitting fitted in the hole.

DETAILED DESCRIPTION OF THE INVENTION

Figures 11, 12:
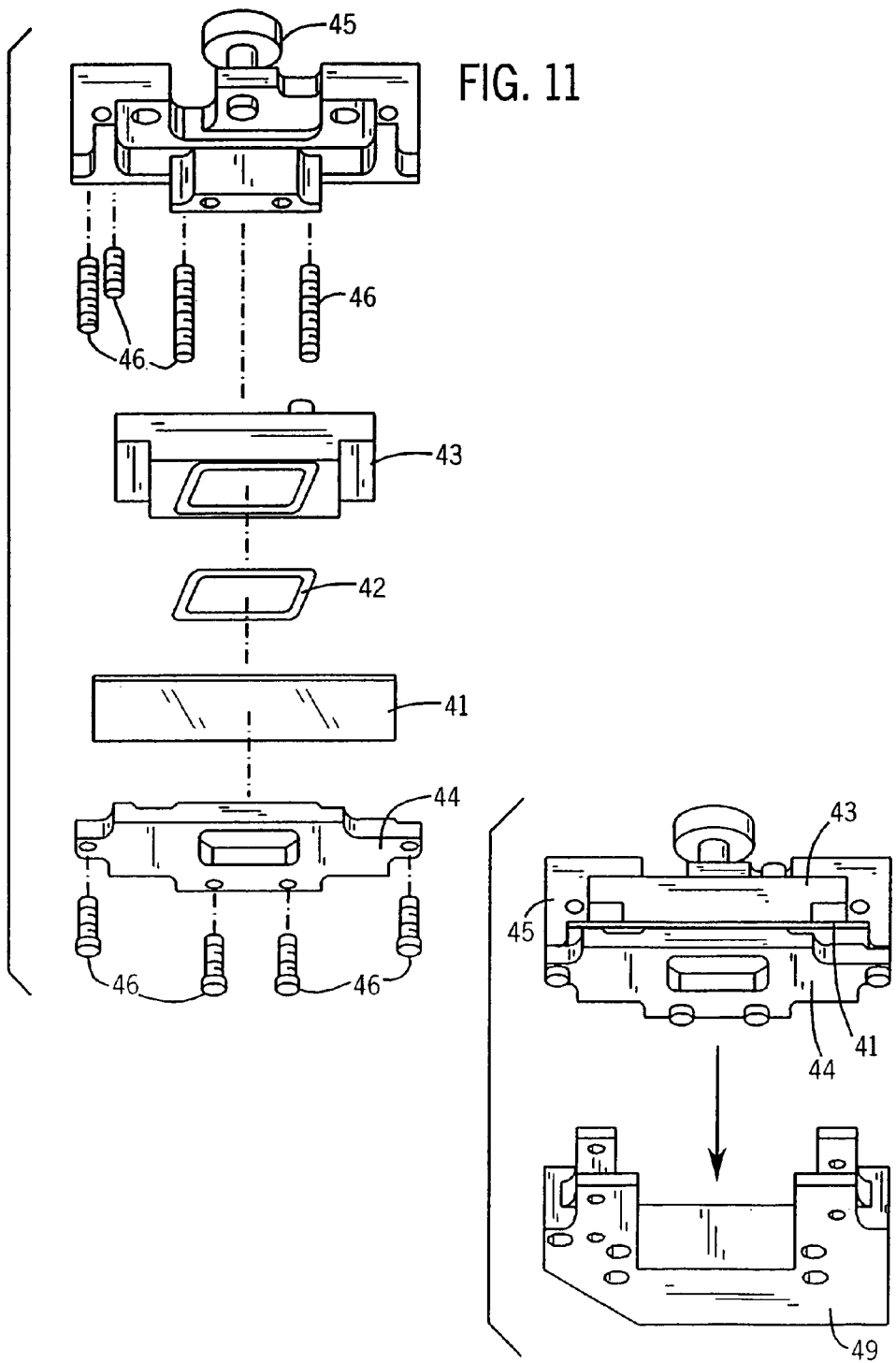
FIGS. 11, 12, 13 and 14 are exploded and assembled views of another flow cell embodiment of the present invention.
Figure 13:
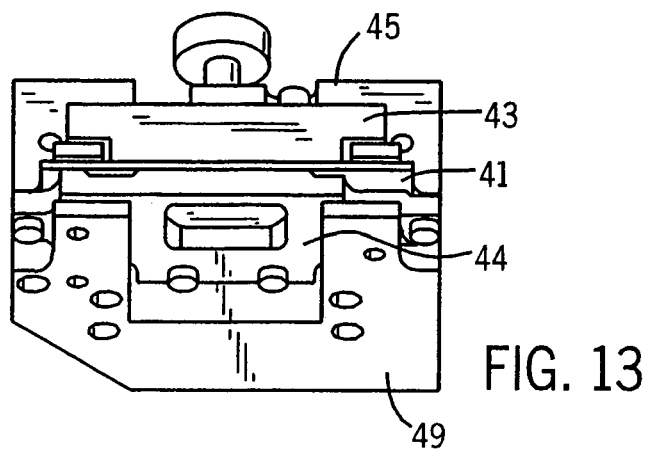
Figure 14:
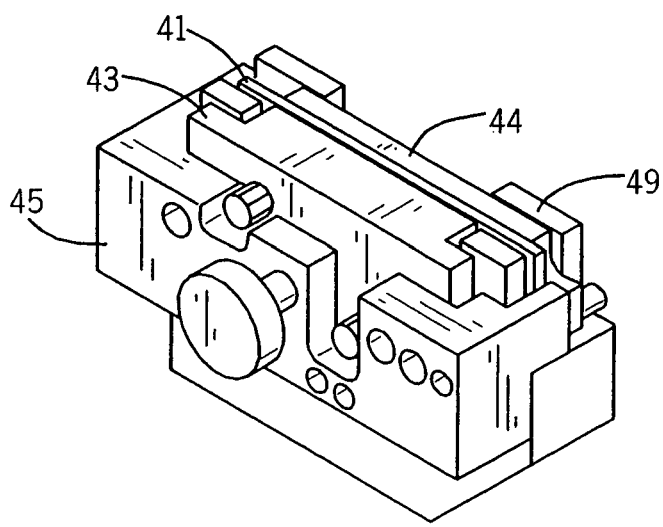
Figure 15:
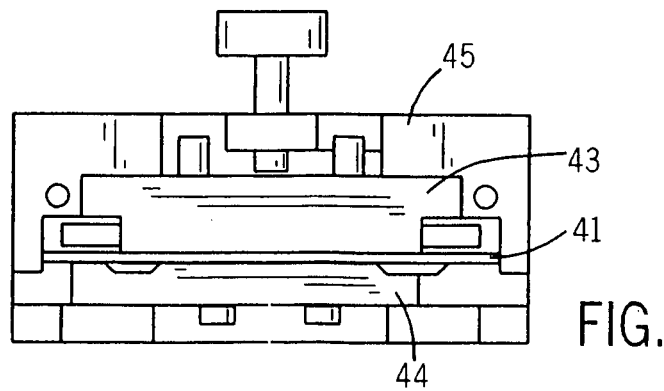
FIG. 15 is a front view of the assembled flow cell embodiment in FIG. 13.

The present invention is an improvement to the type of maskless microarray synthesizer described in the above-mentioned PCT Patent Application No. 99/42813, the disclosure of which is hereby incorporated by reference.

In making a maskless array synthesizer, deposition of nucleic acids is determined by light deprotection of areas of the array. Since the application of light energy determines where the nucleic acids are deposited in the array, the precise control of light is a critical parameter in the quality of the array made. In fact, in making instruments intended to produce high quality arrays with optimal sequence uniformity and consistence in the DNA probes, the control of "stray light" has been found to be among the most important parameters. Stray light, as used here, refers to light which is incident onto areas of the array where is it not desired. Said in other words, stray light is light incident on a cell of the array which is supposed to be unlit at a particular time. Such stray light can lead to the addition of a nucleotide to a probe in a cell where it is not intended to add a nucleotide, thus causing sequence error in probe synthesis.

There are multiple possible sources of stray light. It has been found, for example, that a reflective optical system produces less stray light delivered to the array than a refractive optical system, since in a reflective system the errant light is not focused back toward the array. It has also been found, and will be discussed in greater detail here, that reflected or refracted light in and around the reaction chamber in which the microarray is constructed can be a significant source of stray light. As will be discussed further below, the teaching of this specification are intended to illustrate techniques for and attributes of such a reaction chamber, or flow cell, can be used to minimize stray light during light-directed microarray synthesis. The result is that higher quality and more uniform microarrays can be constructed.

This specification therefore describes multiple embodiments of flow cells for microarray synthesis instruments, the flow cells intended to minimize stray light creation. This is accomplished by optimizing features and parameters in the flow cell to minimize unwanted refraction or reflection of light used in the array synthesis process. The design of the flow cell can be better understood with reference to an exemplary array synthesis instrument. One exemplary instrument using a flow cell with a single reaction chamber and a optical elements light array is shown generally at 110 in FIG. 18. The apparatus includes a two-dimensional array image former 112 and a flow cell or reaction chamber 114 into which an array image is projected by the image former 112. The flow cell, also shown in schematic fashion in FIG. 19, includes a planar substrate 116, on the rear surface of which the microarray is synthesized. The substrate 116 is placed over a chamber 18 formed in the front of an enclosure 120. An inlet port 122 and an outlet port 124 provide fluid communication into and out of the flow cell 114. The image former is constructed to direct the light pattern to the substrate 116, where the reactions occur in the interior, or rear, surface of the substrate 116. The areas of the substrate on which the nucleic acid probes are constructed are indicated schematically in FIG. 19 at 126.

The image former 112 allows for the direction of light from a light source 130 along an optical light path and into the flow cell reaction chamber 114 so that monomer addition reactions may occur in accordance with a pre-selected pattern. The image former 112 includes the light source 130 (e.g., an ultraviolet or near ultraviolet source such as a mercury arc lamp), an optional filter 132 to receive the output beam 134 from the source 130 and selectively pass only the desired wavelengths (e.g., the 365 nm Hg line), and a condenser lens 134 for forming a collimated beam 136. The beam 136 is projected onto an array of optical elements 138.

The optical array 138 is preferable a two-dimensional array of small or miniature optical elements, or micromirrors, which are operable under electronic control such that they may be operated by the output of a general purpose digital computer 140 connected to the optical array 138. The optical array 138 includes optical elements such as mirrors which are capable of, in effect, switching light in amplitude, direction, or other attribute of the light, sufficient to change a portion of the incident light from one state where that portion of the light actuates a reaction occurring in one cell on the substrate 116 in the flow cell 114. There are several examples of optical devices which can serve as the optical array 138. One is an array of micromirrors. Other types of suitable optical arrays include without limitation microshutters, micromirrors operated by bimorph piezoelectric actuators, and LCD shutters. The preferred embodiment is a digital light projector (DLP) integrated circuit available commercially from Texas Instruments.

A micromirror array device 138 has a two-dimensional array of individual micromirrors which are each responsive to control signals supplied to the array device to tilt each individual micromirror in one of at least two directions. Control signals are provided from the computer 140 to the micromirror array device 138. The micromirrors in the array 138 are constructed so that in a first position of the mirrors the portion of the incoming beam of light 136 that strikes an individual micromirror is deflected in a direction such that the light proceeds along the optical path toward the flow cell 114, as described further below. In a second position of the micromirrors in the array 138, the light from the beam 136 striking such mirrors in such second position is away from the optical path to the flow cell, with the result that this light is ultimately absorbed by the instrument without ever being incident on the flow cell 114.

The light which is directed by mirrors in the first position (i.e. toward the flow cell 14), is directed toward the first of two mirrors 142 and 144, which in combination form an Offner optical system. The larger mirror 142 is concave and directs light incident onto one portion of it onto the smaller convex mirror 144. The convex mirror 144 directs incident light to another portion of the concave mirror 142, from which the light is directed to the flow cell 114. The projection optics 112 serve to form an image of the pattern of the micromirror array 138 on the surface of the substrate 116. A DNA synthesizer, indicated at 146, is connected to supply reagents to and from the flow cell 114 through fluid piping 148 and 150. The DNA synthesizer serves, in essence, as a source of reagents and as a pumping agent to deliver reagents to and remove solutions from the flow cell 114.

The instrument is used to construct nucleic acid probes on the substrate. In a direct photofabrication approach, the glass substrate 112 is coated with a layer of a binding layer chemical capable of binding the monomer building blocks. A photolabile protective group is adhered to the binding layer. Light is applied by the projection system 112, deprotecting the photolabile protective groups in defined preselected areas of the substrate 116. The areas to be de-protected are selected by the operation of the mirrors in the micromirror array 138, which selective direct light to or away from the substrate 116. After the light application step, nucleotides are added to the flow cell which them chemically bond only where the de-protection of the photolabile groups has occurred (phosphoramidite DNA synthesis chemistry in the case of DNA probe synthesis). The added nucleotide also has a photolabile protective groups attached to it. This process is repeated for each of the four bases that makes up a nucleic acid monomer, and then repeated again for each level of the building probe strands in the microarray. In the end, a series of single stranded nucleic acid probes are created, the probes arranged in areas or features on the substrate. The process is simple, and if a combinatorial approach is used, the number of permutations increases exponentially. The resolution limit is presented by the linear response of the deprotection mechanism.

Figure 18:
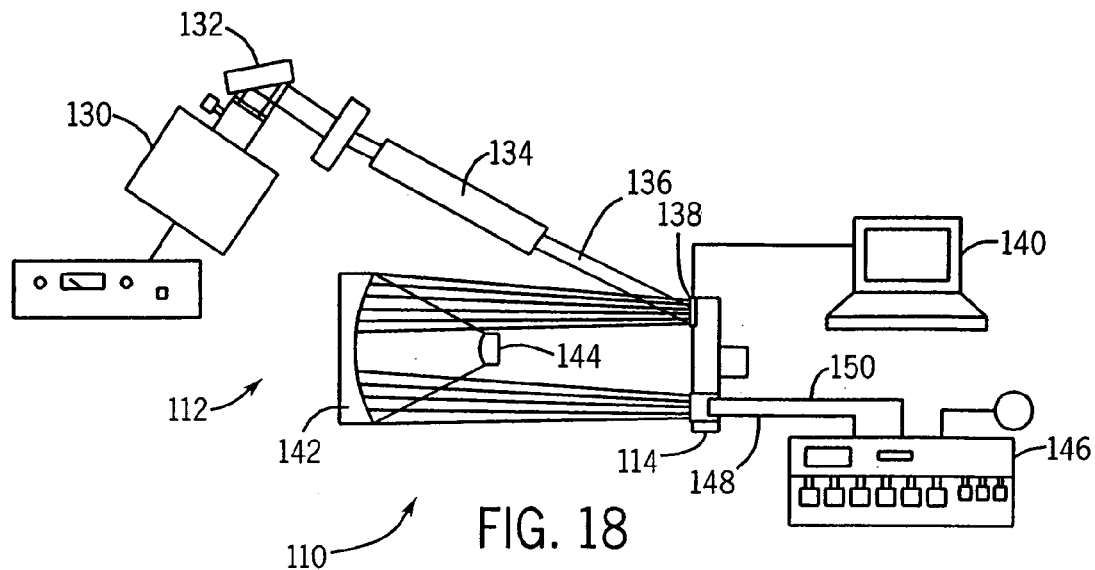
FIG. 18 is a schematic view of an array synthesizer apparatus in accordance with the present invention.
Figure 19:
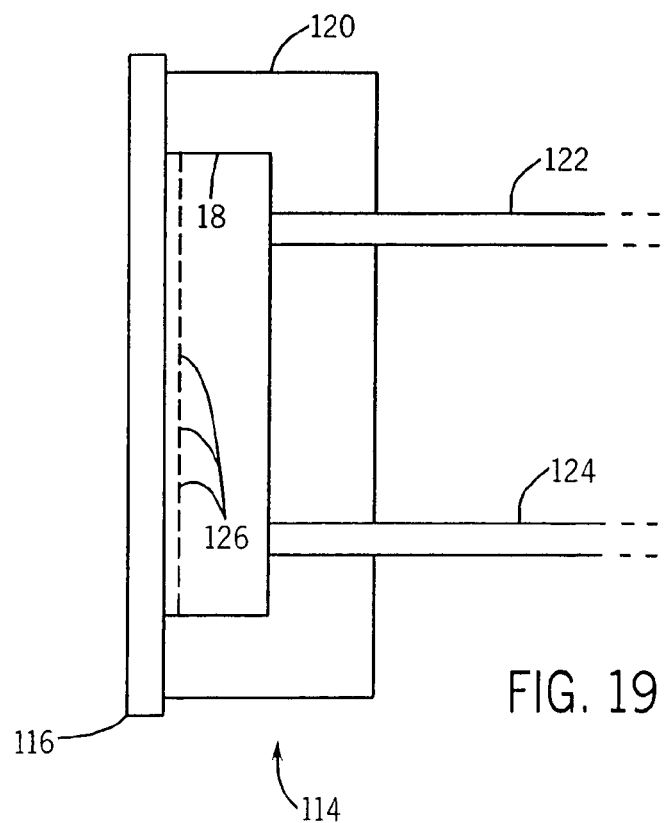
FIG. 19 is a schematic view of the flow cell for the instrument of FIG. 18.

FIGS. 18 and 19 only illustrates one embodiment of array synthesizer apparatus to which the method to correct for illumination nonuniformity disclosed by the present invention can be applied. The present invention disclosed here can also be applied to other array synthesizer apparatuses. The flow cell 114 in FIG. 19 is intended to be illustrated in schematic fashion only. The description that follows describes the preferred physical details of the actual flow cells as used in embodiments of the actual instrument.

The first exemplary flow cell, shown in FIG. 1 includes a base 10, a glass microscope slide 11, a Kal RezTM gasket 12, a block 13, two fluid fittings 14, and a screw press 17. The slide 11 serves as the substrate for microarray synthesis. As illustrated in FIGS. 2–5, the flow cell is held together by bolts 18 and 19 of a screw press 17. On the surface 22 of the block 13, there is a groove 29 (FIGS. 6 and 7) that is constructed to cooperate with the gasket 12. The depth of the groove 29 is less than the thickness of the gasket 12. When the flow cell is held together, the microarray synthesis surface 21 of the slide 11, the gasket 12 and the void formed in the surface 22 of the block 13 together form a sealed reaction chamber or flow chamber, in which the microarray synthesis can occur. The block 13 has two holes 23 which allow fluid delivery into and out of the reaction chamber through fluid fittings 14. The shape and positions of the holes 23 in the block 13 in relation to the gasket 12 are illustrated in FIGS. 6–9. The bottom surface 25 of the holes 23 (FIG. 10) must be flat and smooth enough to accept face seal. The maximum bottom surface tilt 27 of the holes 23 (FIG. 10) is 150. O-ring face seal 28 (FIG. 10) is used at the bottom 25 of the holes 23 for sealing purpose.

The slide 11 (FIG. 1) is made of a material selected for optimization of transmission of the illumination light used for protection group de-protection and resistance to chemicals that come in contact with the slide during oligomer array synthesis. For example, when synthesizing DNA probes with NPOC as the protection group, the optimization is for 365 nm UV transmission and resistance to acids and bases and alkalis. High quality glassine slides of fused quartz are preferred. Other suitable materials for the slide, or substrate, include borosilicate glass and fused silica.

During the light illumination period of an addition cycle in microarray synthesis, deprotecting light 31 is incident the oligomer synthesis surface 21 of the slide 11 (FIG. 1) through the opening 32 of the base 10 and the slide 11. The light 31 then passes through the reaction chamber and reaches the surface 22 of the block 13. During this light illumination period, the reaction chamber is filled with a reaction medium fluid which is matched in refractive index to the material of the substrate or slide 11. One preferred medium is dimethyl sulfoxide (DMSO) with 1% imidazole. Water must be excluded from the flow cell during microarray synthesis using phosphoramidite chemistry to avoid excess protons being present. To reduce the reflection of the illumination light 31 at the interface of the reaction medium and the block 13, the block 13 is constructed with a material that has a similar refractive index to that of the reaction medium, i.e. fused quartz, which has an index of refraction of 1.474 for light at a wavelength of 365 nm. For example, in the case of DNA probe synthesis, the reaction medium used in the reaction chamber or flow cell during the illumination period is usually DMSO with 1% imidazole, which has a refractive index of 1.4, matching the fused quartz. Thus, the use of quartz to construct the block 13 and the DMSO/imidazole reaction medium provides matching indexes of refraction, thereby ensuring that reflections at the interface between the medium and the block 13 are inherently minimized, thus eliminating one source of stray light. Other materials suitable for the block 13 can be used to make the block 13 if the refractive index is compatible at a practical level with the index of refraction of the reaction medium used.

The surface 35 of the block 13 is covered with a layer of material that is selected to minimize reflection of incident light. In fact, the material selected can be any that has anti-reflective properties of light at 365 nm. This anti-reflective coating is intended to make sure that light is not reflected back as it exits the block. Behind the block can be any dark, light-absorbing material or light trap, so that light does not return once it has exited the block 13.

FIGS. 11–15 show a second embodiment of the present invention. The slide 41 which serves as the substrate for oligomer array synthesis, Kal RezTM gasket 42 and the block 43 (FIG. 11) are the same as their counterparts in the embodiment shown in FIG. 1. The only difference between embodiment 2 and embodiment 1 is the flow cell assembly structures that secure the flow cell together. In embodiment 2, a front plate 44 (FIG. 11) and a base 49 (FIG. 12) replace the base 10 (FIG. 1) of embodiment 1. A back press block 45 (FIG. 11) replaces the screw press 17 (FIG. 1) of embodiment 1. Instead of using bolts 18 and 19 (FIG. 1) to secure the flow cell together, embodiment 2 uses locating pins 46 (FIG. 11) to secure the flow cell together. In all other aspects, including the measures taken to reduce the undesired reflections of illumination light, embodiment 2 is identical to embodiment 1.

Figure 16:
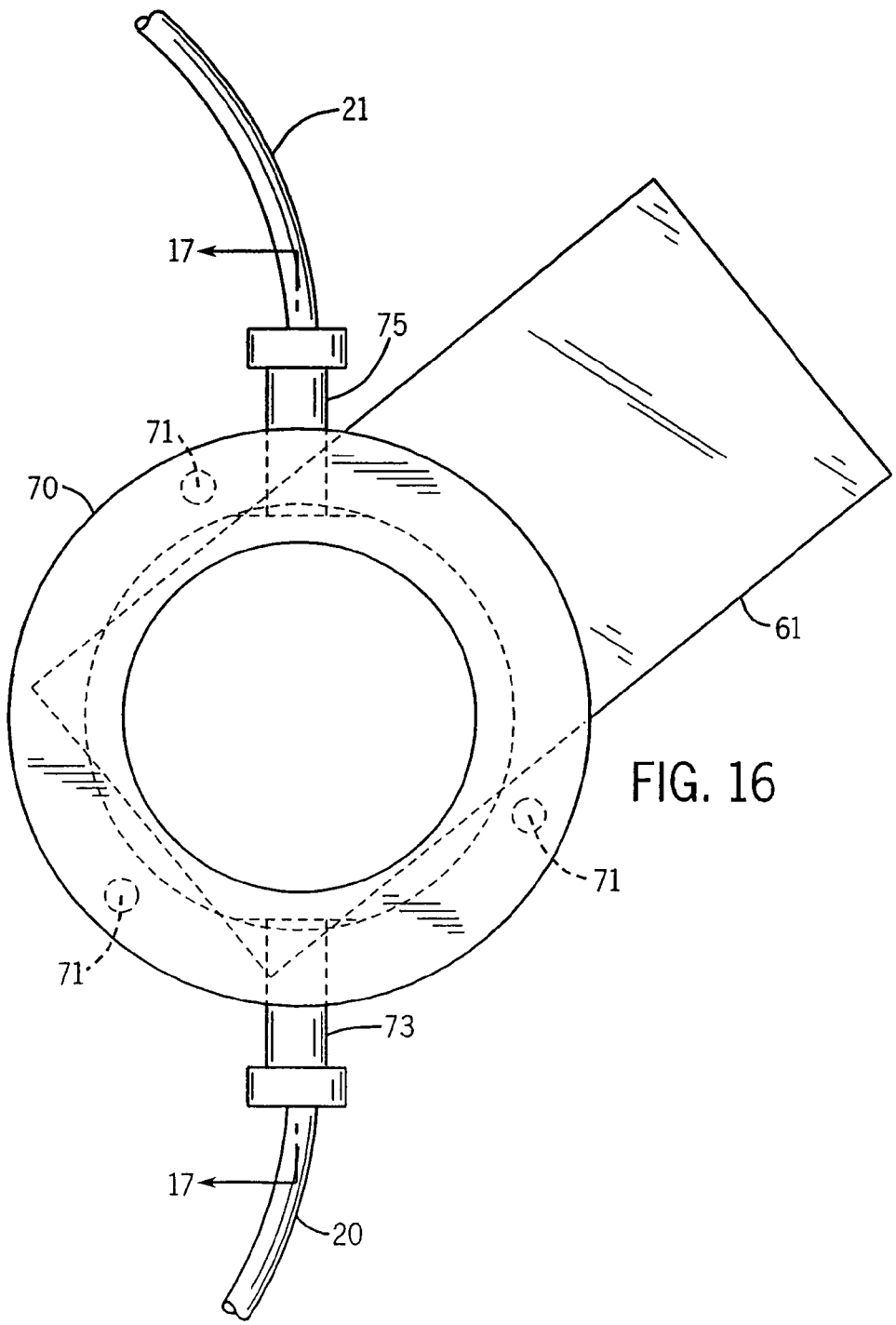
FIG. 16 is a top plan view of still another flow cell embodiment of the present invention.
Figure 17:
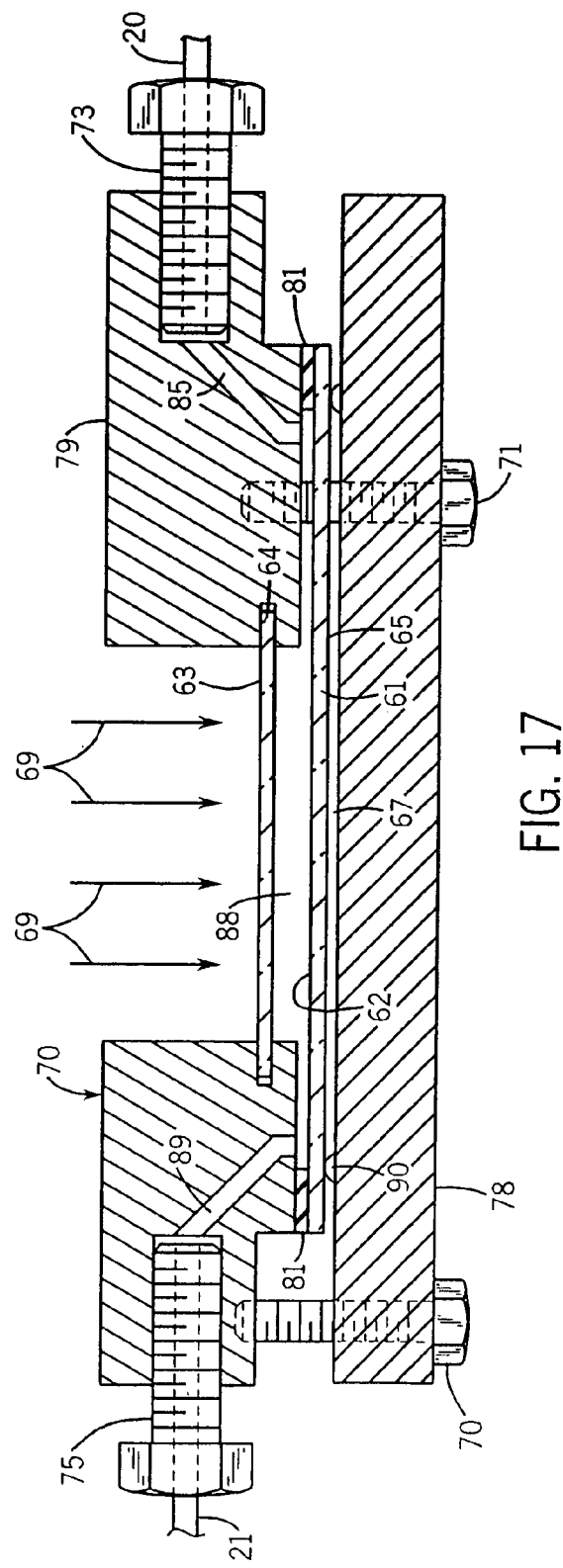
FIG. 17 is a cross section view through the flow cell of FIG. 16 taken generally along the lines 8—8 of FIG. 16.

In another embodiment, shown in FIGS. 16 and 17, the flow cell in FIGS. 16 and 17 includes an aluminum housing 70, held together by bolts 71, having an inlet 73 connected to an input port line 20 and an outlet 75 converted to an out port line 21. As illustrated in the cross-sectioned view of FIG. 17, the housing 70 includes a lower base 78 and an upper section 79 which are secured together over the substrate with the bolts 71. The slide 61, which provides the oligomer synthesis surface 62, is held between the lower base 78 and a cylindrical gasket 81 (e.g., formed of Kal RezTM), which in turn is held into place by the upper section 79 of the housing 70. The upper section 79 of the housing 70 has two slots 64 to hold a chamber cover 63, which tightly fits into the slots 64. The slide 61, the gasket 81, the upper section 79 of the housing 70 and the chamber cover 63 form a sealed chamber 88 for oligomer synthesis. The upper section 79 of the housing 70 has an inlet channel 85 extending from the inlet 73 to a sealed reaction chamber 88 and an outlet channel 89 extending from the reaction chamber 88 to the outlet 75. The bolts 71 can be screwed and unscrewed to detachably secure the slide 61. Preferably, as shown in FIG. 17, a rubber gasket 90 is mounted at the top of the base 78 to engage against the slide at a peripheral region to apply pressure to the slide against the gasket 81.

The slide 61 (FIG. 17) is made of a material selected for optimization of transmission of the illumination light used for protection group depotection and resistance to chemicals that come in contact with the slide during oligomer array synthesis. For example, when synthesizing DNA probes, the material of the slide should have an optimization for 365 nm UV transmission and have resistance to acids and bases.

During the light illumination period of a monomer addition cycle, the illumination light 69 (FIG. 17) passes the chamber cover 63 and the reaction chamber 88, and is incident upon the oligomer synthesis surface 62 of the slide 63. During the illumination period, the reaction chamber of the flow cell is filled with the reaction medium. To reduce the reflection of the illumination light 69 at the interface of the reaction medium and the slide 61, the slide is constructed with a material that has a similar refractive index to that of the reaction medium fluid. For example, in the case of DNA probe synthesis, the reaction medium used in the reaction chamber during the illumination period is usually DMSO with 1% imidazole, which has a refractive index of 1.47. Again, fused quartz glass has a refractive index of 1.474, which is similar to the refractive index of the reaction medium, and can be used to construct the slide 61. Other materials otherwise suitable for the slide 61 can be used to make slide 61 as long as it is matched to the refractive index of the medium used. The surface 65 of the slide 61 is also covered with a layer of anti-reflective material, to reduce the illumination light reflection at the interface of the slide 61 and the air that fills the space 67, or at the interface of the slide 61 and the base 78 when the rubber gasket 90 is not used.

It is understood that the particular embodiments for correction for illumination nonuniformity set forth herein are illustrative and not intended to confine the invention, but embraces all such modified forms thereof as come within the scope of the following claims.

We claim:

1. A flow cell for synthesizing a microarray of DNA probes, comprising:
    a substrate having a surface on which probes are synthesized;
    a block that is located behind and adjacent to the substrate, the block having a void formed in its front surface forming with a rear surface of the substrate a chamber in which a probe synthesis reaction can occur; and
    a medium received in the chamber and in which a probe synthesis reaction can occur, the block being made of a material having a refractive index matched to that of the medium that is in the reaction chamber during an illumination period, the match of the refractive indexes being sufficient so as to minimize refraction occurring at the interface between the block and the chamber.

2. The flow cell of claim 1, wherein the slide is made of a material selected from the group consisting of borosilicate glass, fused quartz and fused silica.

3. The flow cell of claim 1, wherein the block is made of a material selected from the group consisting of fused quartz, borosilicate glass and fused silica.

4. The flow cell of claim 1, further comprising a layer of an anti-reflective material on a surface of the block that is opposite from the side of the black in contact with the chamber and the reaction medium.

5. The flow cell of claim 1, wherein the oligomer synthesis surface of the slide forms another wall of the reaction chamber.

6. An apparatus for synthesizing arrays of oligomers such as DNA probes and polypeptides, the apparatus comprising:
    (i) a flow cell having in which monomer addition reactions can be conducted
    (ii) a substrate forming the front surface of the flow cell, the array being formed on the substrate;
    (iii) a light source providing a light beam;
    (iv) an array of optical elements placed to receive the light beam from the light source and arranged such that each element of the array can be positioned to direct light along an optical axis or to not direct light along the optical axis;
    (v) projection optics capable of receiving the light reflected from the array of optical elements along the optical axis and imaging the pattern of the optical elements onto the flow cell; and
    (vi) the flow cell containing a medium the index of refraction of which is matched to the index of refraction of the substrate, the match being sufficient so as to minimize light refractions at the interface between the substrate and the flow cell.

7. A flow cell for synthesizing a microarray of DNA probes, comprising:

a substrate having a surface on which probes are synthesized, the surface of the substrate also forming one side of a chamber;

a block located behind the substrate, the block having a void formed in its front surface which in cooperation with the surface of the substrate forms the chamber;

a reaction medium in the chamber; and the block and the substrate being made of a material having a refractive index matched to the refractive index of the reaction medium that is in the reaction chamber during an illumination period, the match of the indexes of refraction sufficient so as to minimize refraction occurring at the interface between the block and the chamber.

8. A flow cell as claimed in claim 7 further comprising an antireflective coating applied to the side of the block opposite from the void to prevent internal reflections of light in the block.

* * * * *